United States Patent [19]

Genovese

[11] Patent Number: 5,246,099
[45] Date of Patent: Sep. 21, 1993

[54] BELT STEERING ROLLER MECHANISM AND STEERING ROLL CONSTRUCTION

[75] Inventor: Frank C. Genovese, Fairport, N.Y.
[73] Assignee: Xerox Corporation, Stamford, Conn.
[21] Appl. No.: 961,552
[22] Filed: Sep. 23, 1992
[51] Int. Cl.$^5$ .............................................. B65G 39/16
[52] U.S. Cl. .................... 198/807; 198/840; 198/843; 226/19; 226/179
[58] Field of Search ............... 198/806, 807, 840, 843, 198/842; 226/19, 20, 179; 474/102, 103, 122

[56] References Cited

U.S. PATENT DOCUMENTS

| | | |
|---|---|---|
| 2,593,158 | 4/1952 | Lorig . |
| 2,643,116 | 6/1953 | Hasselquist ........................ 226/19 |
| 2,752,151 | 6/1956 | Levine ................................ 226/20 |
| 3,052,395 | 9/1962 | Scott .................................. 226/19 |
| 3,095,131 | 6/1963 | Robertson et al. ................. 226/19 |
| 3,807,982 | 4/1974 | Claassen et al. ................... 198/843 |
| 4,221,480 | 9/1980 | Spehriey, Jr. . |
| 4,397,538 | 8/1983 | Castelli et al. . |
| 5,078,263 | 1/1992 | Thompson et al. . |

FOREIGN PATENT DOCUMENTS 565535 11/1958 Canada .
730594 5/1955 United Kingdom .

Primary Examiner—Joseph E. Valenza
Attorney, Agent, or Firm—Oliff & Berridge

[57] ABSTRACT

A belt steering roller mechanism for active steering correction of an endless belt, including a shaft having a longitudinal axis and a deformable roller having a fore end and an aft end and a predetermined diameter. The roller is rotatable about the shaft and has a body including a plurality of longitudinally extending rigid members located near the outer diameter of the roll separated by a plurality of longitudinally extending deformable sections. The body may be elastomeric or may be rigid with flexible hinges to provide differential lateral velocity of an outer circumferential surface of the roller. At least one flange plate is located against one of the fore end and aft end and is flexibly held on the shaft by a flexible coupling. Upon a corrective force being applied to the flange plate by an articulating mechanism, the longitudinally extending rigid members are laterally displaced in a cyclic fashion by the flange plate. The outer surface of the steering roller may be textured or coated with a thin sleeve of high friction coefficient material to aid in controlling the belt.

6 Claims, 6 Drawing Sheets

BELT STEERING ROLLER MECHANISM AND STEERING ROLL CONSTRUCTION

BACKGROUND OF THE INVENTION

1. Field of the Invention

The present invention relates to an active steering mechanism for steering an endless belt supported by a plurality of rotatable rollers, and in particular to a steering roll construction which is capable of actively correcting lateral belt misalignment, correcting for "belt walk" (lateral displacement) and "walk rate" (lateral velocity) while all portions of the belt surface, including unsupported sections between guide rollers, are undisturbed when correction is applied.

2. Description of Related Art

Printers and copiers use various active and passive guiding methods for wide belts and webs. Passive designs rely on a balance of forces to restrict the belt to a well defined path. Active systems sense belt position and mechanically realign the guide rolls to steer the belt to a fiducial position.

Passive systems may include hard edge guides which force an edge of the belt to remain on a defined path. This has the disadvantages of not precisely controlling the exact location of the belt and in extreme cases can cause damage to the edges of the belts.

Another passive system is shown in U.S. Pat. No. 2,593,158 which discloses an apparatus for positioning strips. The apparatus includes two spaced-apart rotatable frusto-conical rolls located on a shaft over which a strip or conveyor belt is passed. The frusto-conical rolls are connected to the shaft through loosely fitted keys or spherical bearings. Due to the way the rolls tilt on the shaft independently of one another, corrective forces are exerted on the belt when the belt is not symmetrically positioned.

Another passive system is shown in Canadian Patent No. 565,535 and Great Britain Patent No. 730,594. Both disclose a steering roller made of a flexible material having a plurality of spaced circumferential grooves and rigid annular flange bearings against each end of the roller. If a belt obtains an off-center position, forces within the roll cause a restorative force to be applied to the belt which provides passive corrective action.

U.S. Pat. No. 4,397,538 discloses a belt alignment apparatus which controls a pivoted roller. A spring contacting flanged members resiliently urges a flanged member against one side of a belt being aligned. One of the flanged members then frictionally rotates a disc which tilts the roller to control belt alignment.

U.S. Pat. No. 4,221,480 discloses a belt supporting and alignment system which includes a roller having spaced, flexible discs. Edge guides are located on each end of the roller. If the belt shifts enough to contact one of the guides, the belt bends causing the disks to shift and realign the belt.

The most common active steering method is to introduce corrective skew through a small rotation about the "soft-axis" of one or more guide rolls. This usually involves a yoke arrangement that may be expensive to build and architecturally awkward. While precise control can usually be achieved, this method is less attractive for rigid belts with a large width to length ratio or rigid belts having a high tension. Both of these conditions limit the degree with which the belt path can be twisted or skewed to correct any misalignment. Additionally, it is important in some imaging processes or confined architectures that the surface of the belt remain in a fixed path. This is not possible with the yoke type steering method because the belt geometry must be dynamically twisted or skewed to affect the corrective action. An example of such an active steering method in U.S. Pat. No. 5,078,263 to Thompson et al.

There is a need for a low cost, active steering mechanism which is capable of actively correcting lateral belt misalignment, correcting for "belt walk" (lateral displacement) and "walk rate" (lateral velocity) without reorienting the axis of any roll or spatially altering any portion of the path of the belt being steered.

OBJECTS AND SUMMARY OF THE INVENTION

It is an object of the present invention to provide a low cost, belt steering roller mechanism which can actively correct lateral belt misalignment without introducing belt skew, allowing for more precise image registration, higher belt tensions, and which is particularly useful with belts having a large width to length ratio.

It is another object of the present invention to provide a steering roll which is capable of receiving lateral forces in a cyclic manner from an articulating mechanism and differentially deforming, in response to the cyclic forces, to correct lateral alignment of a belt traveling thereon.

It is another object of the present invention to provide a steering roll capable of differentially steering a belt traveling thereon maintaining unsupported sections of the belt in fixed planes and supported sections in fixed arcs, the roller including a plurality of spaced longitudinally extending rigid members separated by deformable sections near an outer circumference thereof.

These objectives are obtained by the present invention which provides a belt steering roller mechanism for active steering correction of an endless belt, including a shaft having a longitudinal axis and a deformable roller of a predetermined diameter having a fore end and an aft end. The roller is rotatable about the shaft and has a body including a plurality of longitudinally extended rigid members located near the outer diameter of the roll separated by a plurality of longitudinally extended deformable sections. The body may primarily be elastomeric or may be rotationally rigid with hinges providing differential movement of an outer circumferential surface of the roller. At least one flange plate is located against the fore or aft end and is attached by a flexible joint. When a corrective force is applied through the articulating mechanism, the longitudinally extending rigid members are laterally displaced in a cyclic fashion by the flange plate. The outer surface of the steering roller may be textured or coated with a thin sleeve of high friction coefficient material to aid in controlling the belt.

These and other objects will become apparent from a reading of the following detailed description in connection with the drawings.

BRIEF DESCRIPTION OF THE DRAWINGS

The invention will be described in detail with reference to the following drawings wherein.

DETAILED DESCRIPTION OF PREFERRED EMBODIMENTS

Figure 1:
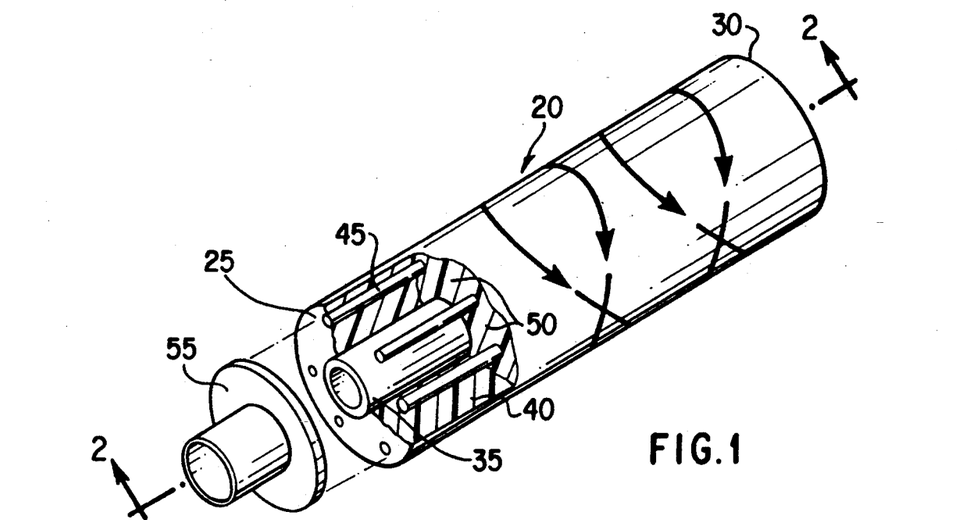
FIG. 1 is an exploded isometric view of a steering roller according to the present invention.
Figure 2A:
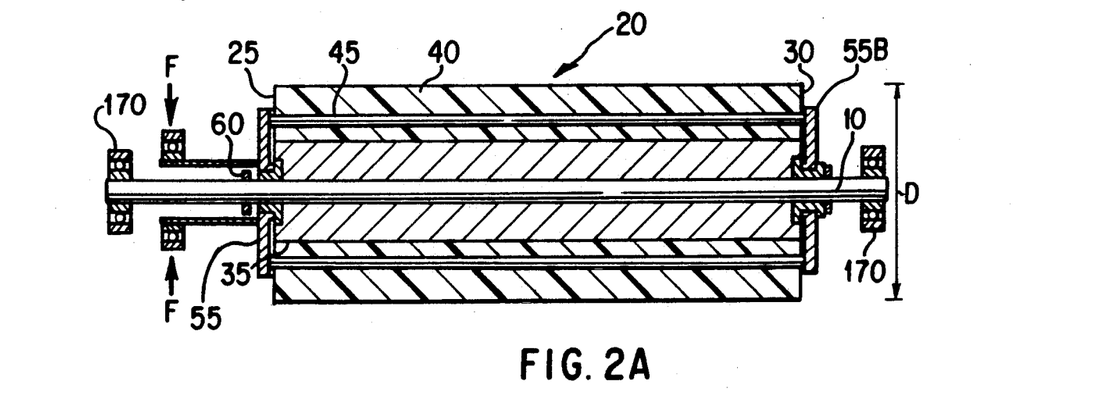
FIG. 2A is a cross-sectional view of the roller of FIG. 1 taken along line 2—2.
Figure 2B:
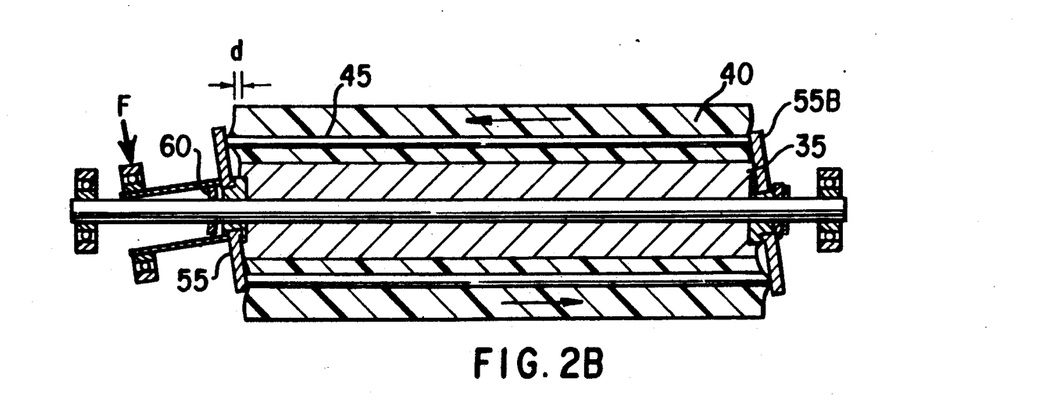
FIG. 2B is a cross-sectional view of the roller of FIG. 1 in a laterally displaced corrective position taken along line 2—2.

With reference to FIGS. 1, 2A and 2B, a belt steering roller mechanism for active steering correction of an endless belt according to one embodiment of the present invention comprises a shaft 10 having a longitudinal axis; a deformable roller 20 having a fore end 25 and an aft end 30 and a predetermined outer diameter D, the roller 20 and shaft assembly being rotatable about the axis of shaft 10 on sleeve or roller bearings 170. The roller has a rigid core 35 and an elastomer body 40 including a plurality of longitudinally extending rigid members 45 located near the outer diameter of the roller 20 separated by a plurality of longitudinally extending deformable sections 50. At least one flange plate 55 is located against the fore end 25 or the aft end 30 and tiltably held on the shaft 10 by a fastening means 60, wherein the longitudinally extending rigid members 45 are laterally displaceable in a cyclic fashion by the flange plate 55. The flange plate 55 may be held in engageable contact with ends of rigid members 45 by many arrangements. The plate 55 may be welded or bonded to the ends of the rigid members 45, held in place by grommets (in which case the flange would have an aperture to accept a portion of rigid members 45), or flange plates may be included on each end of roller 20 and held in place by force balancing during tilting, i.e., the force acting on a lower member 45 on one end by the flange 55 is transmitted through the lower member 45 to flange 55 at the other end of roller 20 and transmitted back to the first flange 55 through a top member 45 (see FIG. 2B).

The flange plate 55 may be articulated by many devices or mechanisms based on a sensed belt position measured by a belt sensor. The art of belt position sensing is well known and will not be described in detail herein. Once lateral belt location has been sensed, the results are compared with a reference to establish the belt position error. The measured error determines the corrective displacement which may be applied to the flange plate 55 by a servo driven shaft or other member. As shown in FIG. 2A, a zero net force F applied to flange plate 55 results in a centered, non cycling condition with no corrective action. As shown in FIG. 2B, applying a net force F to flange plate 55 through action of the articulating mechanism causes the flange plate 55 to tilt at a small fixed angle with respect to the rotational axis of the roller assembly. This results in the flange plate 55 differentially shifting the longitudinally extending rigid members 45 within the roller 20, cyclically distorting the circumferential outer surface of the steering roller 20 in a sinusoidal displacement parallel to the roller axis as the roller turns about shaft 10. The phase of this cyclic disturbance is determined by the orientation of flange plate 55 while the roller 20 is rotating. The circumferential surface of the roller is cyclically displaced a lateral distance d which may be small but through repetitive application, forces a belt in contact with the surface to shift position laterally with no other change in any portion of the belts circumferential path.

The flange plate 55 may be flexibly coupled to the shaft 10 by various means. In all embodiments, the flange plate 20 has an inner diameter larger than the diameter of the shaft 10 so that it is free to tilt slightly. The flange plate 55 may consist of a radial ball bearing and a short tube that is forcably displaced as shown in FIGS. 2A and 2B. The flange plate 55 may also be bonded directly to the ends 25, 30 of the elastomer portion of roller 20 or held within a flexible grommet or with an O-ring of a resilient material such as rubber. Additionally, the flange plate 55 may be separately mounted on spherical bearings. As shown in FIG. 2A, an optional slave flange plate 55B can be located on aft end 30. The slave flange plate 55B is not independently driven in this embodiment, but passively follows the driven flange plate 55.

According to this first embodiment, the steering roller 20 comprises rigid core 35 which is sized to accept the shaft 10. Shaft 10 shown mounted in sleeve or roller bearings in FIG. 2A may be driven from an external power source through a coupler or pulley attached directly to shaft 10, or shaft 10 may be allowed to turn freely under the action of the moving belt and act as an idler roller. Elastomeric roll body 40 is formed around the rigid core 35 and includes a plurality of radially spaced longitudinal rods, which form the longitudinally extending rigid members 45, which run parallel to the longitudinal axis of the shaft 10. A preferred material for body 40 consists of one of several industrial synthetic silicone rubbers with Shore A Durometer hardness in the range of 20 to 50 such as Dow Corning LSR590 series two-component injectable formulations. Rods forming rigid members 45 may be solid, hollow tubing, heavy wire, or rectangular strips that are either bonded directly into the elastomeric roll body 40 or placed in preformed holes or cavities within the elastomeric roll body 40. The rods 45 may be formed of metal or other rigid materials which may be chemically treated with promoters for an improved bond to the elastomer material, as well as physically textured, roughened, or modified such as with perforations, kinks, threads, or embossed surface features to enhance bonding strength to the body of the elastomeric material. The rods forming the longitudinally extending rigid members 45 preferably protrude uniformly a small distance beyond the ends 25, 30 of the roller 20. The flange plate 55, and optionally slave flange plate 55B, act on the protruding rods 45, or alternatively on both ends of the elastomeric sections 25 and 30 as well as the rod ends.

Additionally, as shown in FIGS. 13-16, the function of the rigid members 45 may be provided by sections of flexible cable or wire rope stretched taught between opposing flange plates 55 and 55B, and fastened under tension to the flange plates at both ends by means of clamps, set screws, cement or other standard fastening methods. A preferred embodiment would consist of a single section of wire rope 180 threaded back and forth between opposing holes 190 in flange plates 55 and 55B, much like the strings of an ordinary tennis racquet, and clamped to the flange plates 55 and 55B by screw clamps 200 in threaded holes located between adjacent holes 190 on each plate 55 and 55B. A flexible roller of this type is economical to manufacture and preferably includes an elastomeric roll body 40. The body 40 is formed after assembly of the wire 180 onto the flanges by placing the assembly 20 into a mold and injecting the mold cavity with the elastomeric body which solidifies and completes the roller 20.

Figure 3:
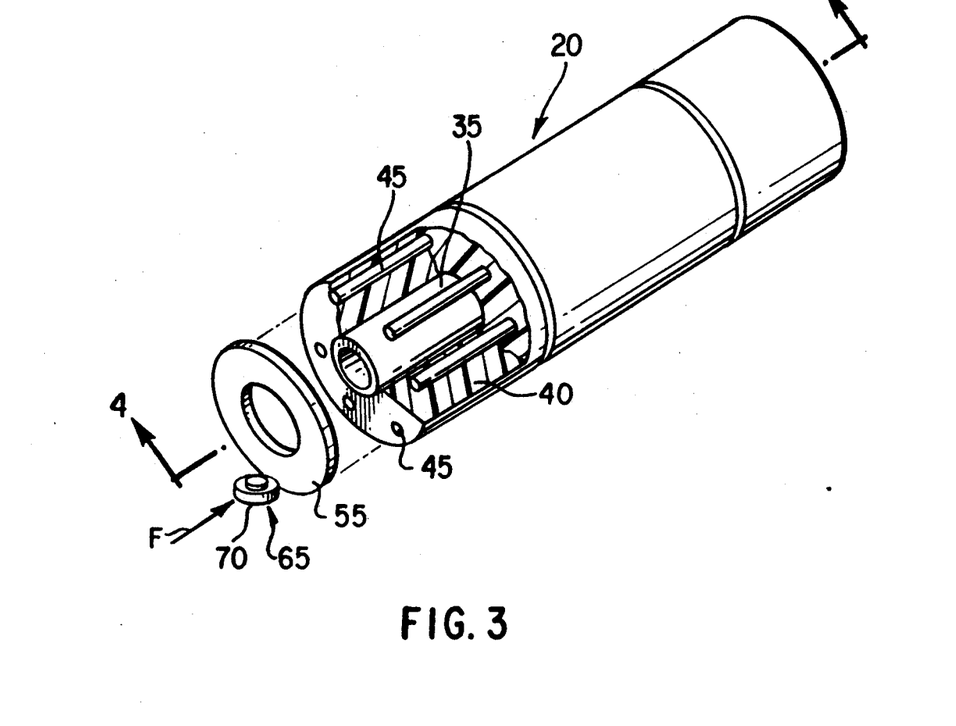
FIG. 3 is an exploded isometric view of another embodiment of a steering roller according to the present invention.

Alternatively, as shown in FIG. 3, the flange plate 55 comprises a cylindrical thin washer approximately the same outer diameter as the steering roller having an inner diameter larger than the diameter of the shaft 10. In this configuration, the washer forming flange plate 55, contacts the longitudinally extending rigid members 45 (shown as cylindrical rods in FIG. 3). The flange plate 55 may be welded, bonded or otherwise affixed to the rigid members 45. A laterally displaceable articulating mechanism 65 is utilized to forcably reorient flange plate 55 causing a cyclic distortion of the circumferential outer surface of the steering roller 20 as the roller turns about shaft 10. Preferably, the articulating mechanism 65 includes a rotatable cylindrical wheeled contact 70 mounted perpendicular to the fore end 25 of the roller 20 as shown. This allows the articulating mechanism 65 to contact the flange plate 55 during rotation of the flange plate 55 with reduced frictional contact.

Figure 4A:
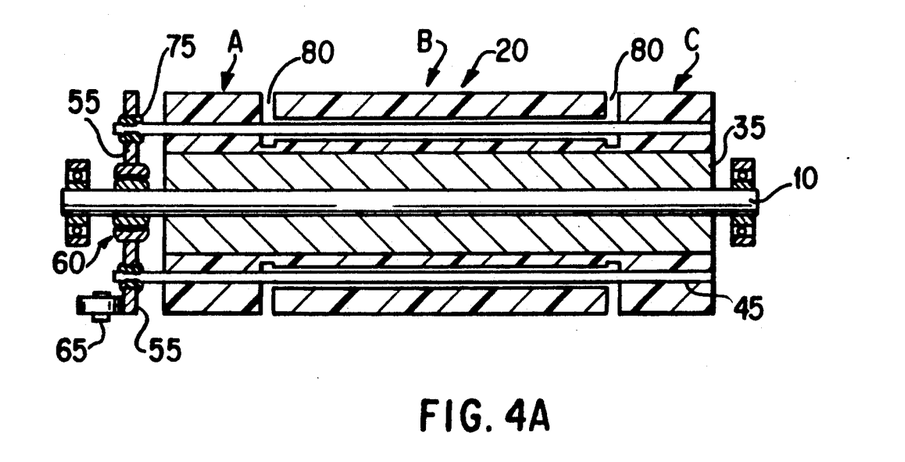
FIG. 4A is a cross-sectional view of the steering roller of FIG. 3 taken along line 4—4.
Figure 4B:
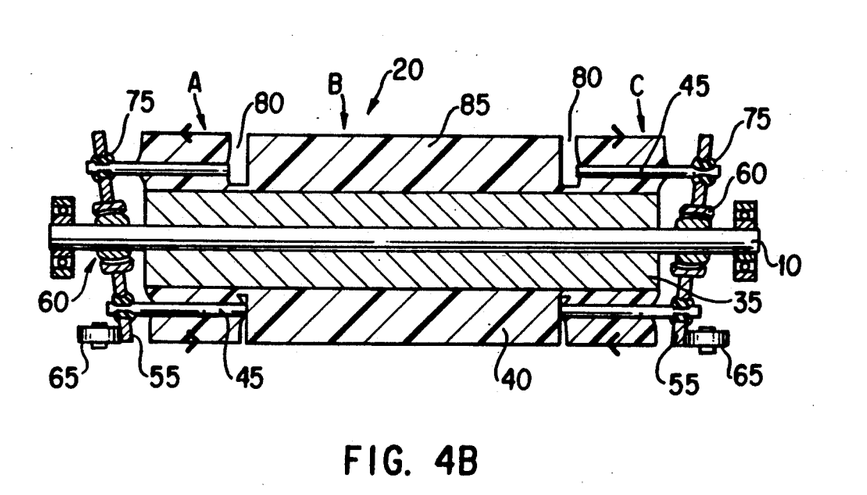
FIG. 4B is a cross-sectional view of the steering roller of FIG. 3 according to yet another embodiment of the present invention taken along line 4—4.

Alternatively, according to another embodiment of the present invention shown with reference to FIGS. 4A and 4B, the driven flange plate 55 is mounted on a spherical bearing or a flexible grommet forming flexible fastening means 60. A pair of spaced circumferential grooves 80 are formed on the steering roller 20. These circumferential grooves 80 are of a depth which extends beyond the longitudinally extending rods 45. In a design in which rods 45 are 1/16 inch thick and are located ⅛ inch below the outer surface of a 3 inch diameter roll for example, a groove depth of at least 3/16 inch is indicated. Groove depth may be chosen as needed to limit or enhance surface action and may extend to the rigid core 35. For a roll length of 12 inches such as might be used in photoelectrostatic copier or printing machine, a preferred groove width of ⅛ inch allows for free lateral surface movement of up to ⅛ inch which is more than sufficient in most applications, and is narrow enough to avoid surface distortion for most belt thicknesses. A nominal width also simplifies groove fabrication.

The pair of circumferential grooves 80 provide articulation segments A, B & C. As shown in FIG. 4A, articulating mechanism 65 is used to articulate flange plate 55. The rods 45 may extend through the flange plate 55 as shown and be fixedly secured thereto by coupling means 75 similar to the flange plate 55 connection to the shaft 10. The flexible fastening means 60 may comprise a flexible grommet, spherical bearings (as shown) or other suitable attaching means which allow minor tilting of the flange plate 55 relative to the shaft 10. The rods 45 extend through openings in segment B of body 40.

As shown in FIG. 4B, two independent articulating mechanisms 65 may be utilized, one on the fore end 25 and one on the aft end 30 of the roller 20. In this embodiment, two flange plates 55 are used, one on each of the fore end 25 and the aft end 30. The steering roller 20 retains the circumferential grooves 80, as in the FIG. 4A embodiment, but the active portions of longitudinal rods 45 extend only from the circumferential grooves 80 towards the ends 25,30, i.e., within segments A and C and either do not extend within a central segment B delimited by the grooves 80 of the steering roller 20, or have been rendered inactive within the central segment B by being severed at grooves 80, for example in the cutting step used to form grooves 80. In this embodiment, the rods 45 are secured to the body 40 in sections A and C by bonding or other suitable fixing methods. With this configuration, the articulating mechanisms 65 may work cooperatively to cyclically distort the circumferential outer surface of the steering roller 20 in sections A and C as before described, or may work in opposition to one another causing sections A and C to act in opposition, one portion of the roller near one end to be outwardly displaced, while an opposite portion of the roller is inwardly displaced as shown in FIG. 4B. The circumferential grooves 80 are sized to accommodate this inward and outward displacement while the central portion 85 of the steering roller 20 is unaffected and remains in a constant lateral position. It should be clear that, in general, as many individual segments as are needed can be arranged in various widths by circumferential grooves 80, and that each segment can be articulated by either of flange plates 55, 55B or remain inactive, depending on the application.

Figures 5, 5A, 6:
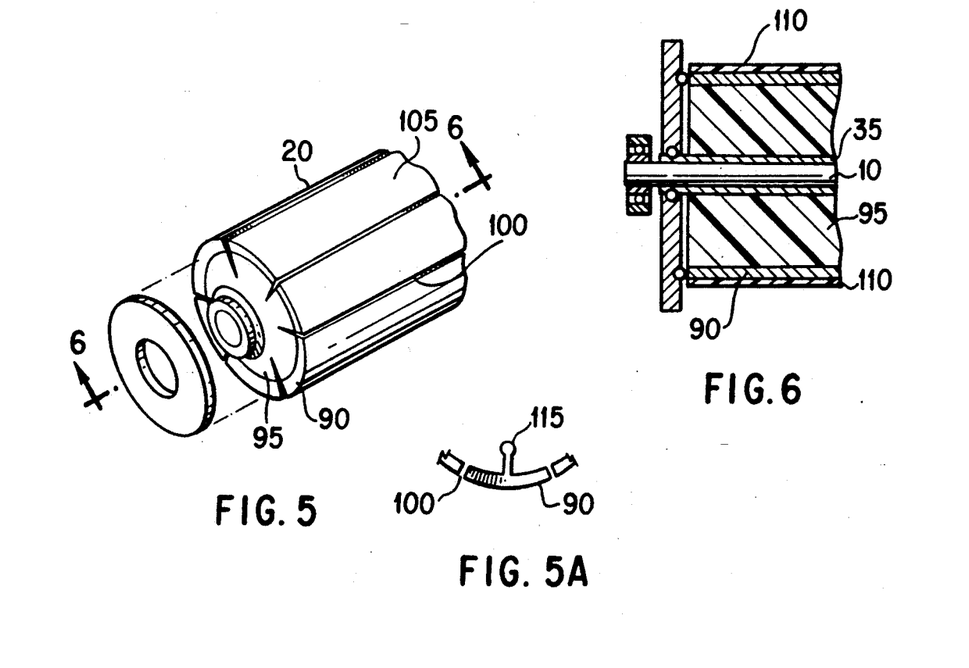
FIG. 5 is a partial exploded isometric view of a steering roller according to another embodiment of the present invention.
FIG. 5A is a partial end view of FIG. 5 showing optional reinforcing ribs.
FIG. 6 is a partial cross-sectional view of the steering roller of FIG. 5 taken along line 6—6.

According to another embodiment, as shown in FIGS. 5 and 6, the body of steering roller 20 may be of a tubular design in which a rigid annular member 90 is bonded to a soft intermediate core 95, such as elastomeric roll body 40 or a sponge core, which is bonded to a rigid central core 35. The rigid annular member 90 includes longitudinally extending slits 100 which extend partially into the intermediate core 95 or alternatively extend through to the central rigid core 35. The longitudinally extending slits 100 provide rigid segments 105 (similar to the longitudinally extending rigid members 45 of the FIG. 1 embodiment) in the rigid annular member 90 while the slits 100 serve the function of mechanically separating segments 105 similar to the deformable sections 50 of the FIG. 1 embodiment, i.e., to allow individual segments 105 of the rigid annular member 90 to be slightly laterally displaced relative to adjacent segments (on the order of a few mils). The depth of the slits determines the degree of connectivity of adjacent segments and the extent of relative displacement achievable for a given applied lateral force. Optionally, an elastomeric sleeve 110 (FIG. 8) may be provided over the rigid annular member 90 or the exposed faces of segments 105 can be individually treated or overcoated to enhance frictional contact with a belt. Additionally, the rigid annular member 90 may be provided with stiffening ribs 115 within some or all of the segments 105 of the rigid annular member 90 depending on the required resiliency and rigidity of the roller 20 (FIG. 5A).

This embodiment may be actively controlled by the articulation mechanism 65 as in the previous embodiments and the flange plate 55 can be of any of the types previously described.

Figure 7:
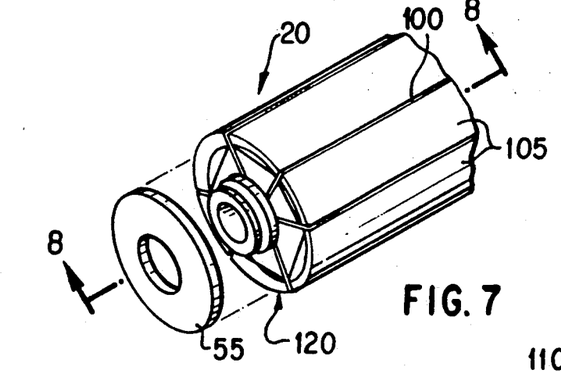
FIG. 7 is a partial exploded isometric view of a steering roller according to yet another embodiment of the present invention.
Figure 8:
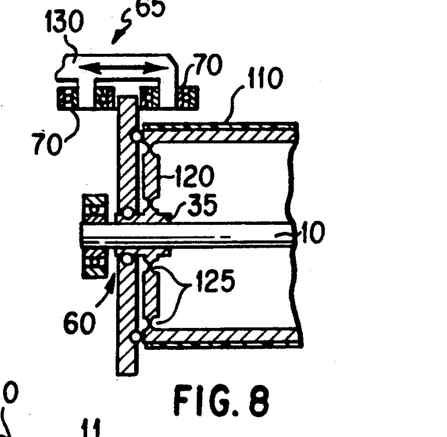
FIG. 8 is a partial cross-sectional view of the steering roller of FIG. 7 taken along line 8—8.

According to yet another embodiment of the present invention as shown in FIGS. 7 and 8, the steering roller 20 may comprise an all tubular design, either formed of metal or molded into a rigid tubular structure from plastic or other suitable materials.

In this embodiment, the steering roller 20 comprises rigid core 35, longitudinally extending outer circumference segments 105 separated by slits 100, and flexible end bells 120. The flexible end bells 120 can be formed by providing multiply oriented flex hinges 125 as shown in FIG. 8. These flex hinges 125 preferably are formed by narrowing the cross-sectional dimensions of the end bells 120 near the core 35 and rigid tube 90 such that these hinges 125 will flex upon application of lateral force, causing the outer circumference of the steering roller 20 to be laterally displaced without significant change in diameter. When utilizing a plastic or similar material for forming the end bells 120 and the rigid tube 90, the end bells 120 may be integrally formed with the rigid tube 90. When utilizing a material such as a metal, the end bells mau be formed similar to that of a plastic rigid tube and end bell, i.e., machined, coined, or electroformed to form narrow flex hinge portions that are welded, soldered or chemically bonded to the laterally extending segments 105. End bells 120 can of course be assembled from individual components of different materials selected for their relative suitability such as a composite design utilizing an aluminum frame with thin beryllium copper foil inserts for the flexing members, and steel or bronze bearing surfaces. The rigid annular member 90 may also include elastomeric sleeve 110 or special coatings to enhance frictional contact with a belt.

Another arrangement for driving the flange plate 55 is also shown in FIG. 8. In this arrangement, which is applicable to all of the previous embodiments as well, the articulating mechanism 65 may includes a pair of rotatable wheeled contacts 70, one located on each side of the flange plate 55 perpendicular thereto. These wheeled contacts 70 are connected together by a linkage 130 which allows a suitable drive such as a linear servo motor to laterally displace the wheeled contacts 70 and subsequently reorient the flange plate 55 and cyclically displace segments 105 of the steering roller 20. This design has the advantage of working equally well in extended and retracted servo positions.

Figure 9:
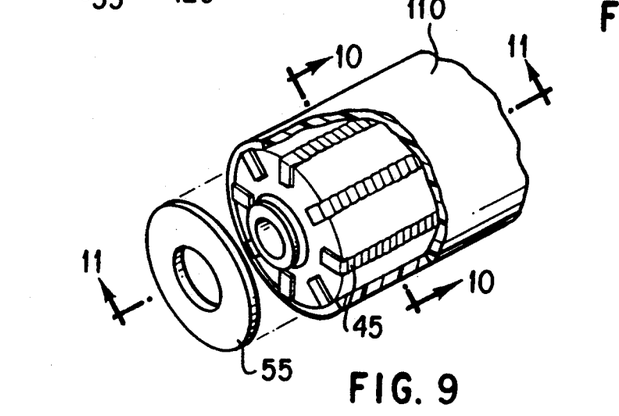
FIG. 9 is a partial exploded isometric view of a steering roller according to a further embodiment of the present invention.
Figure 10:
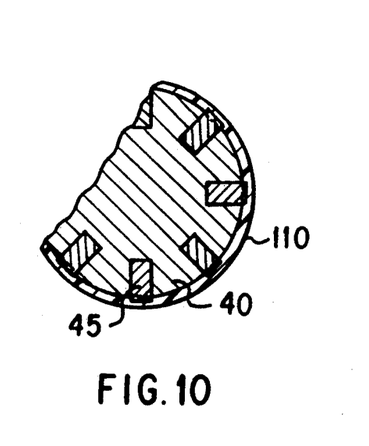
FIG. 10 is a partial cross-sectional view of the steering roller of FIG. 9 taken along line 10—10.
Figure 11:
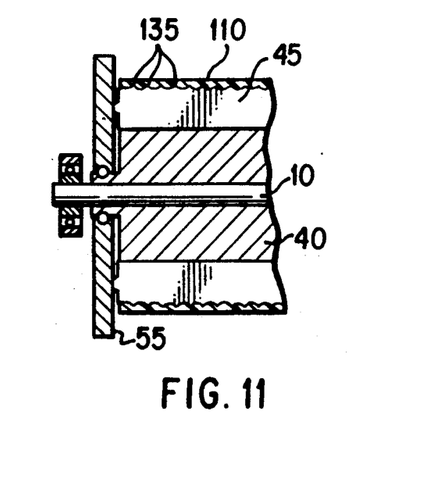
FIG. 11 is a partial cross-sectional view of the steering roller of FIG. 9 taken along 11—11.

As shown in FIGS. 9-11, the steering roller 20 may include a solid roll body 40 which has cut, molded, or otherwise formed longitudinally extending cavities which house longitudinally extending rigid members 45. The members 45 preferably are rectangular in cross section and have a plurality of serrations 135 on a top side thereof. The serrations 135 engage or enhance frictional contact with a sleeve 110 covering the roll body 40. Sleeve 110 is preferably elastomeric to allow for lateral flexing of the sleeve material under the cyclic forces of members 45. Sleeve 110 can be a high friction coefficient material, or a low friction coefficient material overcoated with a high friction coefficient layer, or a high friction coefficient material with a low friction coefficient inner coating. The rigid members 45 preferably extend slightly beyond the ends 25, 30 of the roller 20 to allow contact with flange plate 55. Articulation of rigid members 45, and the resulting lateral forces applied to the belt in contact with the surface of the roller in this embodiment, is similar to that described for FIGS. 1 through 8.

Figure 12:
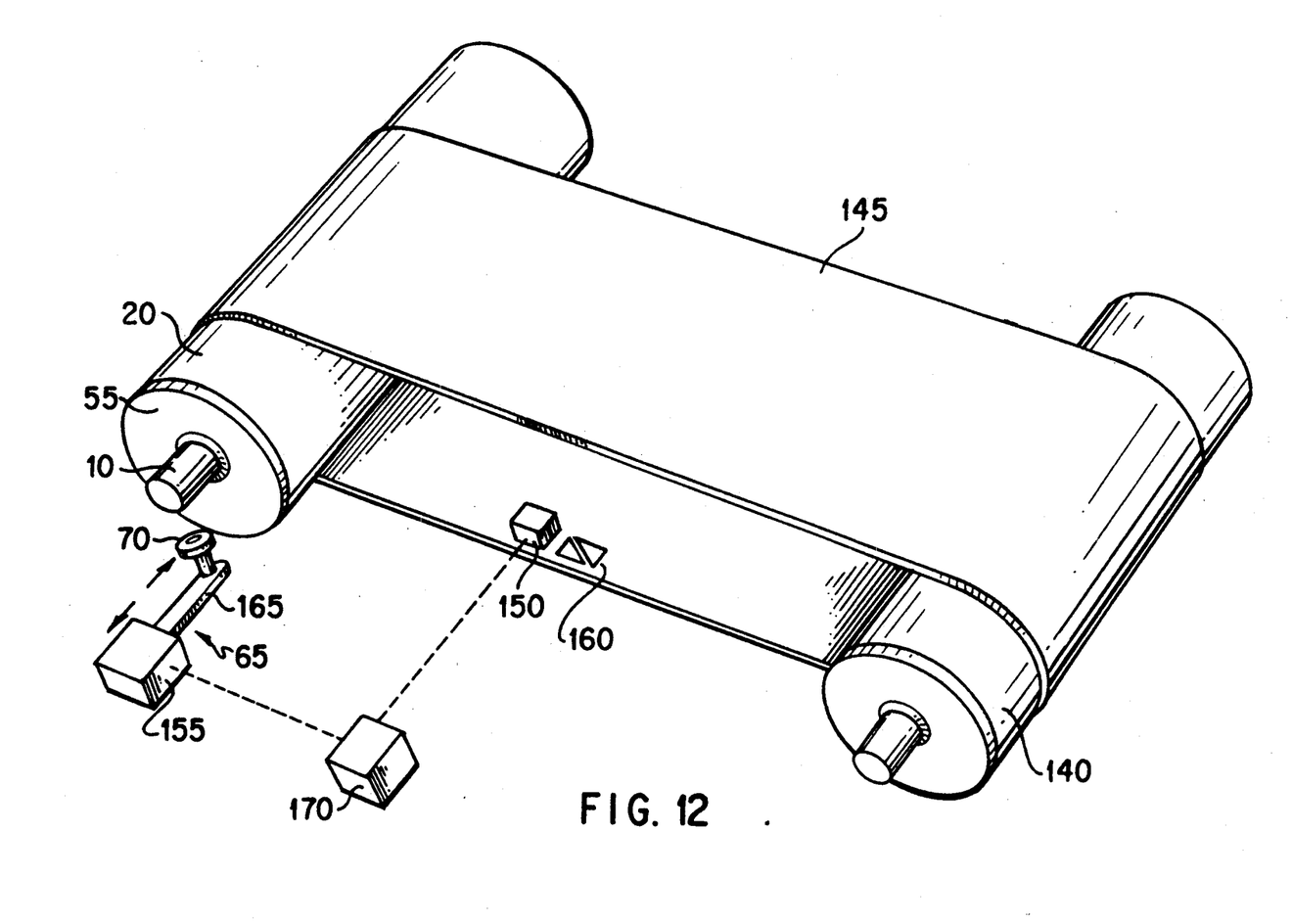
FIG. 12 is an isometric view of an endless belt system for actively correcting the lateral placement of a belt on a plurality of rollers including a steering roller according to the present invention.
Figures 13, 14, 15:
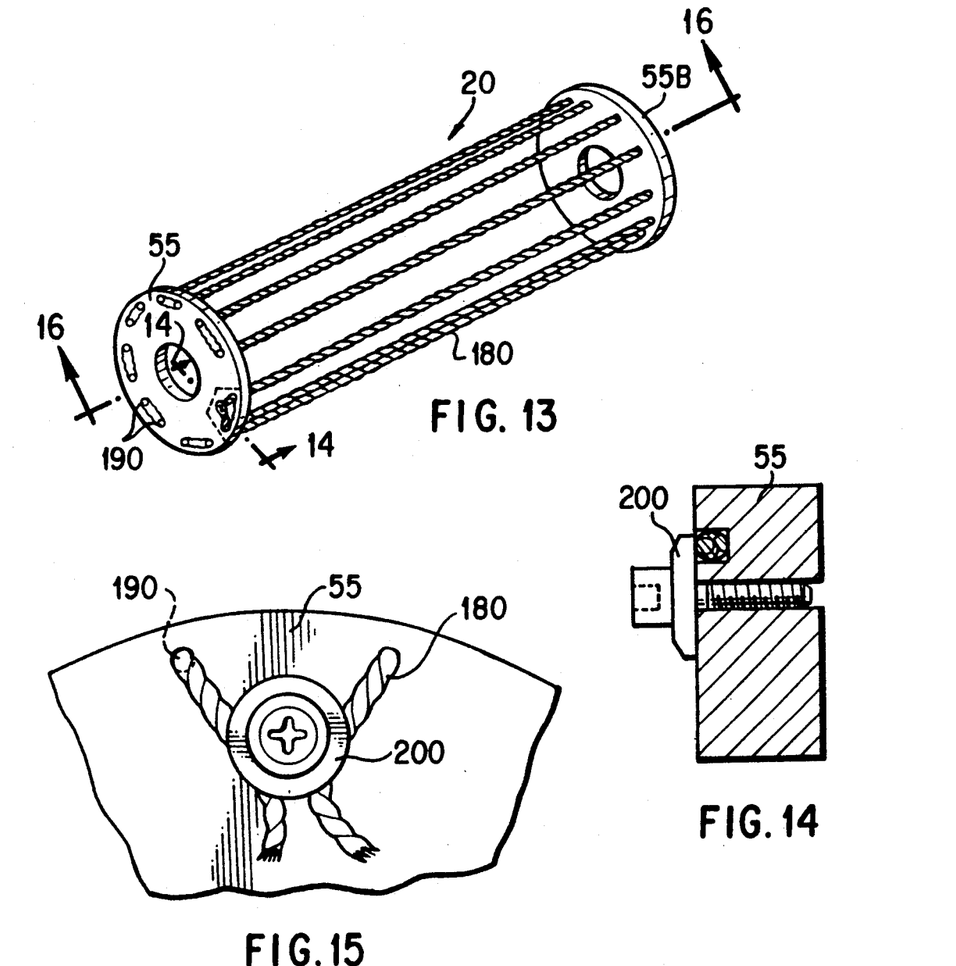
FIG. 13 is an isometric view of another embodiment of a steering roller according to the present invention.
FIG. 14 is a partial cross-sectional view of a portion of a flange plate shown in FIG. 13.
FIG. 15 is a partial end view of the flange plate in FIG. 13.
Figure 16:
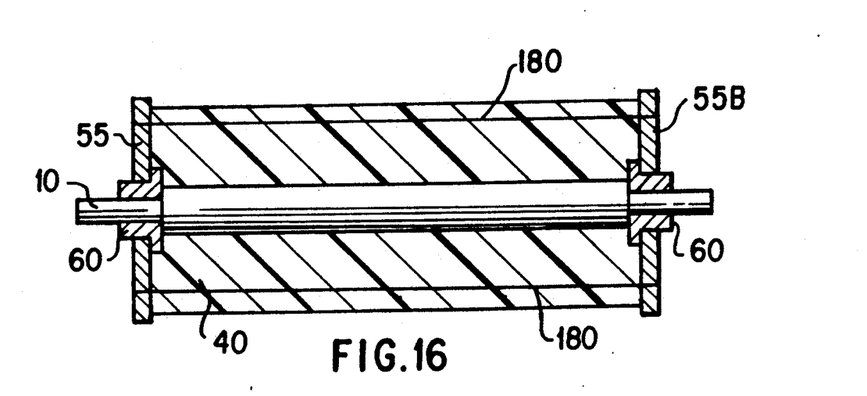
FIG. 16 is a cross-sectional view of the steering roller of FIG. 13 taken along line 16—16 including an elastomeric roll body.

FIG. 12 shows an isometric view of an endless belt system utilizing a steering roller and corrective mechanism according to the present invention. The system includes a steering roller 20 and a drive roller 140, both rotatable about a longitudinal axis. A belt 145 is supported on the rollers 20, 140 for rotation thereabout. The drive roller 140 is actuated by a drive motor (not shown), while the steering roller 20 is in an idler configuration.

A lateral belt sensor 150 senses lateral belt position by detecting the belt edge or by monitoring a belt position marker 160 which is located on the belt 145. The art of sensing lateral belt position and generating a differential error signal for the purposes of applying corrective action is known in the art and will not be discussed in detail herein.

Control 170 is designed to amplify, filter and selectively manipulate the signal from belt sensor 150 according to a predetermined algorithm or optimized output response, and deliver an actuating control signal to the articulating mechanism 65, which preferably includes a wheeled contact 70 connected to a servo motor 155, such as a linear servo, through a linkage 165. The servo motor 155 is capable of laterally displacing the wheeled contact 70 in the direction of the longitudinal axis of the shaft 10, so that the wheeled contact 70 can laterally displace the contacted portion of flange plate 55, which upon rotation cyclically distorts the outer surface of the steering roller 20 to actively correct for lateral belt misalignment, without displacing any portion of belt 145 out of its normal path. This reduces wear and stresses on the belt 145 and also allows the use of higher tensioning of the belt 145 around the rollers 20, 140. Additionally, it allows for active control of wide belts which are too short to be steered by a tilted "soft-axis" roller as performed in most active steering roller methods.

It is well known that many imaging, development, and image transfer processes are sensitive to the mechanical spacing of critical gaps and nips in the process path. The ability to actively steer the belt laterally without displacing the belt path widens the choice of available system architectures because all portions of the belt path can be utilized equally well for critically spaced processes. Absence of a dynamically shifting surface path can also be used to advantage by allowing a general reduction of spacing tolerances for better overall process optimization and image quality enhancement.

The present invention is especially applicable to copier belts, such as a photoreceptor belt, where more than 5 to 10 mils of deflection is rarely needed to produce adequate steering action. This is easily obtainable by all of the above-described embodiments.

The invention has been described with reference to the preferred embodiments thereof, which are illustrative and not limiting. Various changes may be made without departing from the spirit and scope of the invention as defined in the appended claims.

What is claimed is:

1. A belt steering roller mechanism for active steering correction of a belt, comprising:
    a shaft having a longitudinal axis and a diameter;
    a deformable roller having a fore end and an aft end, said roller being rotatable about said shaft and having a body including a plurality of longitudinally extending rigid members separated by a plurality of longitudinally extending deformable sections, said longitudinally extending rigid members being sections of wire rope under tension formed in a serpentine path; and
    at least one flange plate located against one of said fore end and said aft end, said flange plate having an aperture forming an inner diameter which is larger that the diameter of said shaft, said flange plate being tiltably held on said shaft by a fastening means, wherein said longitudinally extending rigid members are laterally displaceable in a cyclic fashion by said at least one flange plate by an externally applied force to effect correction of said belt travelling on said roller mechanism.

2. The belt steering roller mechanism of claim 1, wherein said tension is provided by said fastening means.

3. The belt steering roller mechanism of claim 1, wherein said deformable roller and said belt have substantially a same width.

4. The belt steering roller mechanism of claim 1, wherein said deformable roller has a width substantially wider than said belt.

5. The belt steering roller mechanism of claim 1, wherein said belt is endless.

6. A belt steering roller mechanism for actively steering correction of an endless belt, comprising:
    a shaft having a longitudinal axis;
    a roller having a laterally movable outer surface and two ends, said roller having a fore end and an aft end and rotatable about said shaft, said roller having a body including a plurality of longitudinally extending rigid members separated by a plurality of longitudinally extending deformable sections, said longitudinally extending rigid members being sections of wire rope formed in a serpentine path; and
    a control means for laterally cyclically moving said outer surface of said roller by applying a force to either of said two ends, said lateral movement of said outer surface effecting correction of a path travelled by said belt across said roller mechanism.

* * * * *